Jan. 7, 1964     T. H. FIKSE     3,116,957
SELF-OILING ELASTIC JOURNAL BEARING
Filed Aug. 8, 1961     2 Sheets-Sheet 1
Fig. 1.
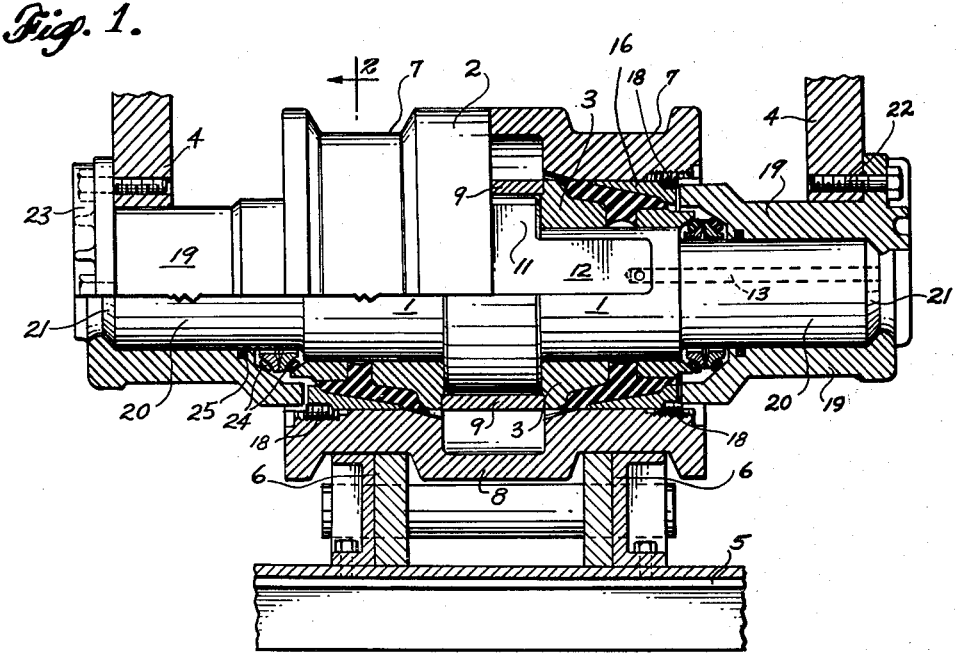
Fig. 2.
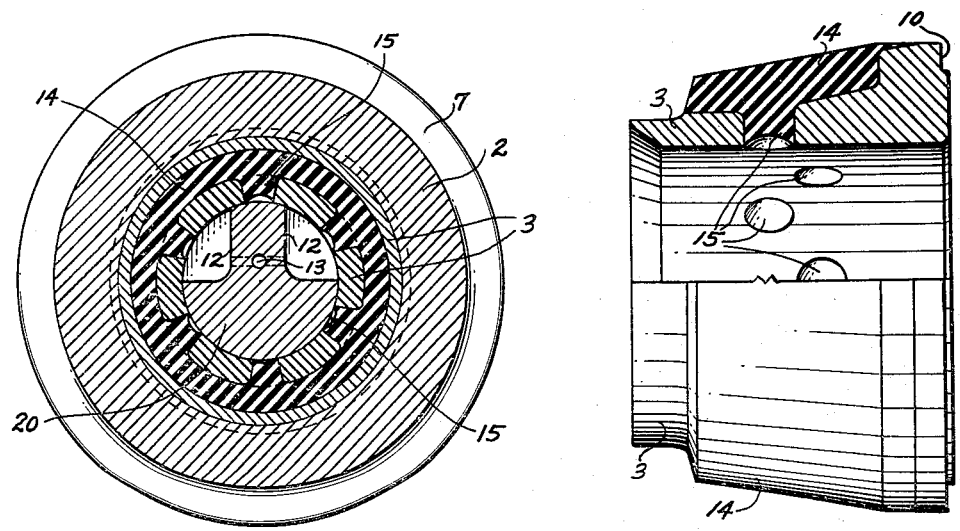
Fig. 3.
INVENTOR.
TYMAN H. FIKSE
BY
*Robert W. Beach*
ATTORNEY

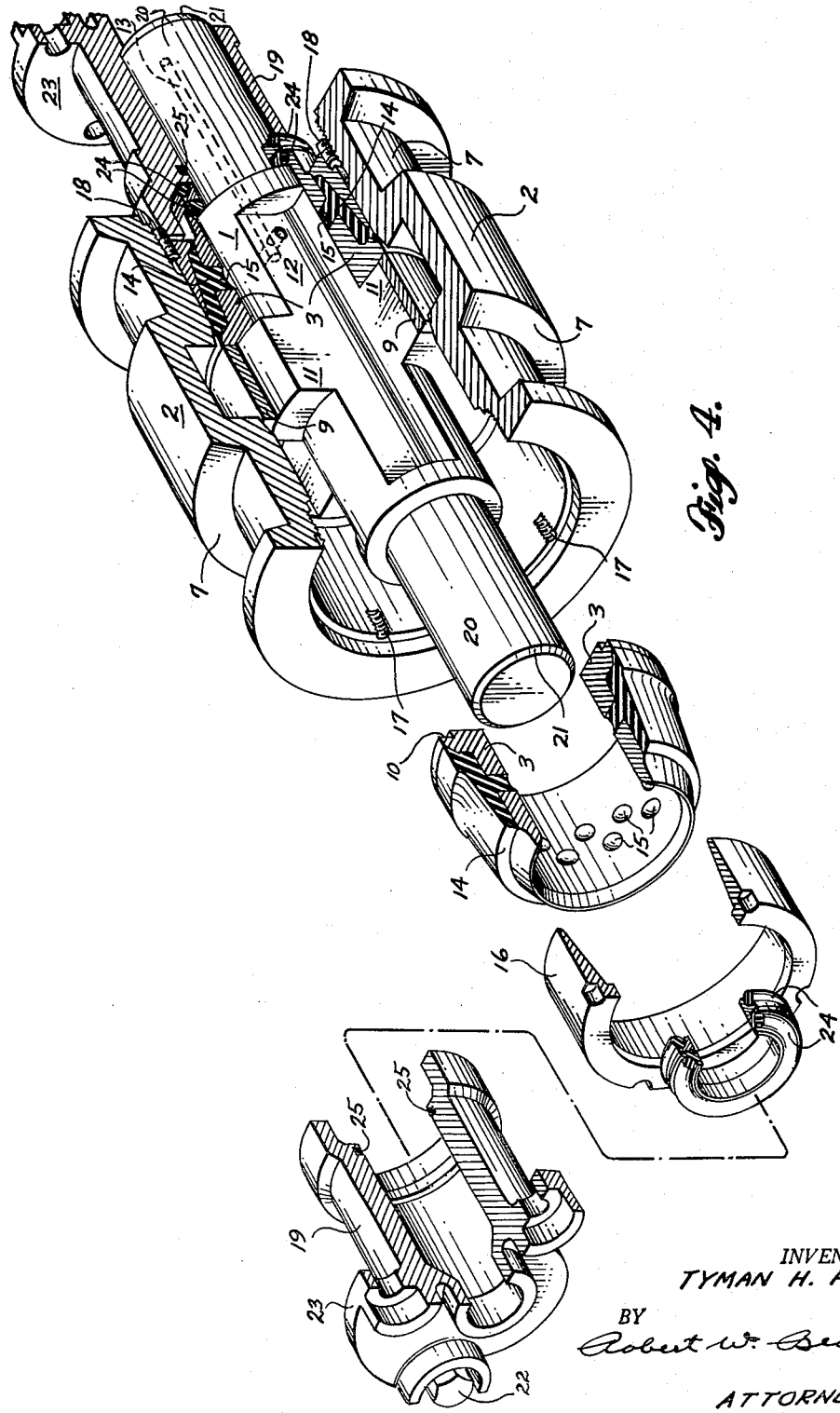

United States Patent Office 3,116,957
Patented Jan. 7, 1964

3,116,957
SELF-OILING ELASTIC JOURNAL BEARING
Tyman H. Fikse, 14434 6th Ave. S., Seattle 88, Wash.
Filed Aug. 8, 1961, Ser. No. 130,100
18 Claims. (Cl. 308—103)

This invention relates to a journal bearing of the sliding surface type and particularly one which is self-oiling. This operation is accomplished by the bearing being of the elastic type including a resilient rotative member.

The greatest problem in the utilization of bearings, and particularly those subjected to heavy loads, has been providing proper lubrication for the bearing. Theoretically, the relatively sliding surfaces of a bearing should never come into actual contact, but should always be separated by a thin film of lubricant in order to minimize friction. The problem has been to maintain a tenacious film of lubricant between those portions of the relatively sliding surfaces which tend to be pressed toward each other to the greatest extent by the load on the bearing. The problem is particularly aggravated where the bearing is subjected to heavy loads, such as in bearings of tractor frame supporting rollers.

A principal object of the present invention is to provide a self-oiling type of journal bearing which will automatically supply continually a small amount of lubricant at, or adjacent to, the portions of the sliding surfaces which are subjected to the greatest compression load.

A further object is to supply such lubricant between the stationary bearing surface and a portion of the rotative bearing surface moving toward the greatest compression load bearing location so that the lubricant will be moved toward the bearing portion subjected to the greatest load.

It is also an object to supply the lubricant progressively over the bearing surfaces, rather than at a concentrated location.

Another object is to exert localized pressure on the lubricant, as it is supplied, for the purpose of distributing the lubricant over the bearing surfaces at the location of greatest load.

In thus supplying lubricant between the bearing surfaces it is an object to utilize simple and rugged construction which will operate reliably and with a minimum of wear and improper operation for an extended period of time.

It is a further object to provide such a bearing of rugged construction which will carry heavy radial loads and in which the lubricant is supplied between the bearing surfaces reliably, irrespective of the intensity or variation in intensity of the load to which the bearing is subjected.

Another object is to provide such a bearing which can be assembled quickly and disassembled readily, even after a long period of use.

A bearing construction capable of accomplishing these objects may include relatively rotatable shaft and shell members between which members is interposed a bearing sleeve of composite character secured to the rotating member. The sleeve is of bearing material with a band of elastomer material providing oil carrying recesses next to the stationary bearing member, and deformable radially so that the recesses are reduced in volume as the bearing parts rotate relatively to express oil progressively from the recesses into the space between the bearing sleeve and the stationary member at or near the location where they are subjected to the greatest load. Specifically, the bearing sleeve may have apertures spaced circumferentially around it into which projections of the elastomer sleeve extend and are bonded to the bearing sleeve with the ends of the projections being cupped in a relaxed condition to form recesses which can receive oil from a reservoir and from which the oil will be squeezed by deformation of the elastomer band as its projections are moved successively to that portion of the bearing subjected to the greatest load.

FIGURE 1 is a side elevation of a roller assembly utilizing the bearing of the present invention, parts being shown in section and parts being broken away.

FIGURE 2 is a transverse section through the roller assembly taken on line 2—2 of FIGURE 1.

FIGURE 3 is a side elevation of the bearing sleeve and elastomer separator band of the bearing with parts broken away.

FIGURE 4 is a top perspective of the bearing applied to a roller, parts being broken away, parts being shown in section and parts being shown in exploded relationship.

The bearing construction of the present invention is particularly well adapted for applications in which the bearing is subjected to heavy radial loads. In general, the bearing includes a shaft 1 and a shell 2, which are relatively rotatable and between which one or more bearing sleeves 3 are located. As far as the operation of the bearing is concerned, it is immaterial whether the shaft rotates relative to a stationary shell, or the shell rotates relative to a stationary shaft, and it is further immaterial whether the radial load is applied so that the shaft and shell are pressed toward each other at or near the bottom, or are pressed toward each other at or near the top, or at some other location. Moreover, relative rotation between the shaft and shell may occur only unidirectionally, or in reverse directions, or even in an oscillating fashion if the degree of relative rotation is equal to at least approximately one-half rotation a large part of the time. It is not necessary to revise the bearing construction appreciably when the position of maximum radial load shifts circumferentially of the bearing over a considerable angle, but it is necessary to provide a different construction to utilize the principle upon which the bearing operates if the rotative and stationary members are interchanged, because the bearing sleeve 3 must be mounted to rotate with the rotatable member of the bearing and relative to the stationary member.

For purposes of illustrating a typical application of the bearing construction of this invention, the invention has been shown as being embodied in a tractor supporting roller. For this purpose the shaft 1 is nonrotative and constitutes an axle for supporting the tractor frame 4. The tractor is carried by an endless tread track, including track sections 5 having driving chain links 6 projecting inwardly from them. The shell 2 constitutes a roller which rolls in one direction or the other along the rows of links 6, depending on which direction the track is driven by the conventional track driving mechanism to move the tractor forward or rearward. Thus, the roller 2 is reversely rotatable relative to the axle 1.

The bearing structure is secured against displacement axially of the axle 1 relative to the tractor frame by being secured to skirt portions 4 of such frame. The roller 2 is then mounted on the axle, as will be described in detail, in a manner to prevent shifting of the roller lengthwise along the axle. To retain the track in proper relationship to the roller lengthwise of the axle, the links 6 are received in circumferential grooves 7 provided in the opposite end portions of the roller. Between these grooves is therefore formed the circumferential ridge 8 which fits between the track chains for preventing lateral movement of the track off the bearing rollers.

While at least one bearing sleeve 3 is interposed between the axle 1 and the roller 2, the structure shown in the drawing includes two of these bearing sleeves spaced lengthwise of the axle and received, respectively, within opposite end portions of the roller shell. These sleeves are held in axially spaced relationship by the spacer ring 9 located centrally of the roller and having its opposite edges fitted into small recesses 10 in the adjacent ends of the bearing sleeves 3. Such bearing sleeves, then, are disposed respectively at opposite sides of the circumferential ridge 11 on the axle 1 and located generally centrally of it. The spacer ring encircles this ridge and is of an axial width greater than the axial thickness of the axle ridge, so that clearance space will be left between the ridge 11 and the adjacent ends of the bearing sleeves, as well as between the periphery of the ridge and the interior of the spacer ring.

In the particular example of the bearing embodying the present invention, as has been mentioned above, the axle 1 is nonrotative and the roller 2 turns about the axle. It is necessary, therefore, for the bearing sleeves 3 to be secured to the roller shell 2 for rotation with it so that the inventive structure of the bearing can be provided for the bearing sleeve. Such sleeve can be made of any desirable plain bearing material, such as its inner periphery, which slides relative to the axle, being made of brass and the axle being made of steel. In this particular type of bearing the weight of the tractor will press the axle downward toward the endless track so that the location of greatest pressure between the axle and the bearing sleeve will be at the lower side of the axle. The purpose of the present invention in an application of this type is to provide and maintain continuously sufficient lubricant between the lower portion of the axle and the adjacent inner portion of the bearing sleeve to prevent metal-to-metal contact occurring during relative movement of the axle and the bearing sleeve.

At the low pressure side of the nonrotative member is an oil reservoir which, in the bearing construction shown, is the cavity 12 formed in the upper side of the axle 1. Because the bearing structure illustrated in the drawings is reversible, such a cavity is provided at opposite sides of the axle and adjacent to the high pressure side of the bearing. This cavity can be supplied with oil as needed through the oil supply passage 13 extending lengthwise through the axle 1 to one or both of its ends. Such oil reservoir should have access to the sliding surface of the bearing sleeve, but the metal surface of the sleeve cannot be relied upon to pick up oil from the reservoir and carry it to the high pressure side of the bearing. Means are therefore provided to receive oil from the reservoir 12 as the roller 2 and sleeve 3 rotate relative to the axle, and to carry such oil to the high pressure side of the bearing and there deposit it to form a film of lubricant between the sliding surfaces of the bearing sleeve and the axle.

The means for carrying the oil from the reservoir at the low pressure side of the bearing to the space between the sliding surfaces of the bearing at its high pressure side, include the elastomer band 14 shown as encircling the major portion of the bearing sleeve 3, but having inner portions next to the shaft or axle shaped to form oil-receiving recesses or cavities variable in volume by deformation of the band to receive and discharge oil. In the construction shown the bearing sleeve 3 has in it a plurality of circumferential rows of apertures spaced circumferentially and arranged so that the holes of axially adjacent rows are in staggered relationship. The elastomer band 14 then has projections 15 projecting into such apertures. The ends of such projections next to the axle are cupped to form recesses when the band is in relaxed condition.

It is also preferred that the elastomer band, or at least the projections 15, be bonded to the bearing sleeve. Such construction can be accomplished by molding the elastomer in place in a position encircling the bearing sleeve. Such elastomer may be of neoprene, for example, so that it will have high resistance to deterioration by the lubricant. Such elastomer material when poured in liquid form into a mold shrinks during setting and if the liquid elastomer material is poured flush with the inner periphery of the bearing sleeve 3, the projections will shrink so that their ends will be cupped, as shown best in FIGURE 3, when the elastomer material has set. If the solidified band is subject to sufficient radial pressure while being confined, it will be deformed locally so that the volume of the cup or recess in the end of the projection will be reduced and may be virtually eliminated, as shown in the lower portion of FIGURES 1 and 2.

In order to distribute the compression force uniformly over the elastomer band 14 and confine its external periphery, it is preferred to encircle the band with a confining collar 16. To enable such collar to be applied easily to the band and, if desired, to enable the elastomer band to be placed under some initial compressive stress, the band is shown as being conically tapered externally and the collar 16 is shown in FIGURES 1 and 4 as being internally tapered oppositely and complementally to the taper of the band exterior. Consequently, the collar can be applied to the band by movement of the collar axially of the bearing until it engages the band's periphery. If the collar is pressed onto the band, the band will be initially stressed. In the two bearing sleeves shown in FIGURE 1 the peripheries of the elastomer bands taper in opposite directions respectively as do the interiors of the two collars 16. The exteriors of these collars are cylindrical and of a size to fit snugly within the opposite end portions respectively of the roller shell 2.

As has been mentioned, in order to obtain the intended self-oiling operation by the use of the construction described, the bearing sleeve should move in synchronism with the rotative member of the bearing. Consequently, the bearing sleeve 3 is effectively secured to the roller 2 by anchoring to the roller shell the collar 16 covering the elastomer band 14. For this purpose half threaded sockets 17 can be formed in the shell. In the covering collars are recesses to receive the other half of the respective set screws 18. The set screws can be screwed into the threaded sockets of the shell and bear against the ends of the collar recesses to press the collar firmly inwardly to preload the resilient elastomer band 14 to whatever extent may be desired. The set screws will lock the collars against both circumferential and radial movement relative to the roller. Such collars in turn confine the outer peripheries of the bands 14 which separate the collars and the sleeves 3 and such sleeves are pressed axially of the bearing into firm engagement with opposite edges of the spacer ring 9.

By the construction described, the bearing sleeves 3 are held securely in the opposite end portions of the roller shell 2 and the axle 1 can move only very slightly lengthwise relative to the roller because its circumferential ridge 11 is confined between the adjacent edges of the bearing sleeves. To mount the roller and axle assembly on the frame of the tractor caps 19 are provided which fit snugly over the opposite reduced end portions 20 of the axle 1. Preferably the axle ends have chamfers 21 against which complementally inclined flanges of the cap ends fit to hold the axle against lengthwise movement. These caps are secured to the frame skirt 4 by bolts 22 extending through apertures in the flange 23 of each cap.

The bearing structure can be sealed to prevent entrance of dirt between the relatively sliding surfaces of the axle 1 and the bearing sleeve 3 by conventional ring seals 24 engaged between each reduced end portion 20 of the shaft and the end of each cap 19 adjacent to the bearing sleeve. A similar seal can engage the end of such bearing sleeve, as shown in FIGURES 1 and 4. To accommodate such seals the sleeve end and cap end are internally chamfered. In addition, an O-ring seal 25 may be utilized to provide a static circumferential seal between each reduced axle outer end portion 20 and the enclosing cap 15. Any lubricant which escapes from between the relatively sliding surfaces of the bearing will collect between the end of the bearing sleeve, the cap 19 and the ring seals 24 and overflow from such space will gradually seep axially of the bearing at its lower pressure side back into the reservoirs 12 for recirculation.

The portion of the bearing where lubricant is most needed is between the relatively sliding surfaces of the bearing where the radial load is greatest. This also is the portion of the bearing where it is ordinarily most difficult to supply lubricant, particularly if a pressure lubricating system is not used. Efforts have been made by the use of previous self-oiling constructions to move lubricant axially of the bearing between the sliding surfaces, but there is no appreciable relative movement axially of the bearing which could be used for effecting such a supply of lubricant. In bearings using the present invention the lubricant is carried circumferentially of the bearing from a location adjacent to a portion of the bearing carrying little or no radial load to those portions of the bearing subjected to the greatest radial load, where the lubricant is most needed.

In the present construction it will be noted that the oil reservoirs 12 are in the stationary member 1 of the bearing at a location spaced circumferentially of the bearing from the location of greatest radial load. The recesses in the ends of the elastomer band projections 15 are placed in communication with such oil reservoir, as the bearing rotates, when they are in relatively expanded condition. As the bearing sleeve rotates to move such a projection from the oil reservoir toward the portion of the bearing subjected to the greatest axial load, the radial pressure on the elastomer band increases which squeezes it radially progressively so that the projections are pushed in a direction to decrease the size of their end recesses. By such action oil supplied from the reservoir to such recesses is expelled from the recesses and expressed into the space between the sliding surfaces. Moreover, the greater the radial load to which the resilient elastomer band is subjected, the greater will be the reduction in size of each projection end recess as the projection moves toward the portion of the bearing subjected to the greatest radial load, and consequently, the greater will be the amount of lubricant expressed from the recesses between the relatively sliding surfaces at this location. This change in volume of the recesses as the bearing sleeve rotates is illustrated most clearly in FIGURE 2.

I claim as my invention:

1. A self-oiling journal bearing comprising a shaft member, a shell member encircling said shaft member, one of said members being rotative and the other being nonrotative, a bearing member rotatable with the rotative member and circumferentially slidable relative to the nonrotative member, and a member of resilient elastomer material rotatable with said bearing member, located between said shaft member and said shell member and having a recess in a portion thereof adjacent to the bearing surface of the nonrotative member, the nonrotative member having an oil reservoir at a location spaced circumferentially from the portion of the nonrotative member's bearing surface subjected to the greatest radial load and accessible to such elastomer material member recess as the rotative member rotates, said elastomer material member being squeezed by load on the bearing as the rotative member rotates to reduce the volume of such recess as it approaches the portion of the nonrotative member subjected to the greatest radial load for expressing oil therefrom between the relatively sliding bearing member and nonrotative member.

2. A self-oiling journal bearing comprising a shaft member, a shell member encircling said shaft member, one of said members being rotative and the other being nonrotative, a bearing member secured to the rotative member for rotation therewith and circumferentially slidable relative to the nonrotative member, and a band of resilient elastomer material rotatable with said bearing member, located between said shaft member and said shell member and having a recess in a portion thereof adjacent to the bearing surface of the nonrotative member, the nonrotative member having an oil reservoir at a location spaced circumferentially from the portion of the nonrotative member's bearing surface subjected to the greatest radial load and accessible to such elastomer material band recess as the rotative member rotates, said elastomer material band being squeezed by load on the bearing as the rotative member rotates to reduce the volume of such recess as it approaches the portion of the nonrotative member subjected to the greatest radial load for expressing oil therefrom between the relatively sliding bearing member and nonrotative member.

3. A self-oiling journal bearing comprising a shaft member, a shell member encircling said shaft member, one of said members being rotative and the other being nonrotative, a bearing sleeve rotatable with the rotative member and circumferentially slidable relative to the nonrotative member and having therethrough an aperature opening adjacent to the bearing surface of the nonrotative member, and a recess-forming member received in such bearing sleeve aperture, forming a recess in the aperture adjacent to the bearing surface of the nonrotative member and movable radially relative to said bearing sleeve to vary the volume of such recess, the nonrotative member having an oil reservoir at a location spaced circumferentially from the portion of the nonrotative member's bearing surface subjected to the greatest radial load and accessible to the recess of such recess-forming member as the rotative member rotates for supplying oil thereto, said recess-forming member being movable by load on the bearing as the rotative member rotates to reduce the volume of such recess as it approaches the portion of the nonrotative member subjected to the greatest radial load for expressing oil from the cavity between the relatively sliding bearing sleeve and nonrotative member.

4. A self-oiling journal bearing comprising a shaft member, a shell member encircling said shaft member, one of said members being rotative and the other being nonrotative, a bearing sleeve disposed between said shell member and said shaft member, rotatable with the rotative member and having therethrough a plurality of apertures spaced circumferentially and opening adjacent to the bearing surface of the nonrotative member, a band of elastomer material on said bearing sleeve and having projections extending therefrom into the apertures of said sleeve, the end of each projection being cupped to form an oil-receiving recess in relaxed condition, said band being deformable by pressure exerted by the rotative member during rotation of said bearing sleeve to reduce the volume of such projection recesses for expelling oil therefrom, and the nonrotative member having an oil reservoir at a location spaced circumferentially from the portion of its bearing surface subjected to the greatest radial load and accessible to the recesses of said projections when in expanded condition for supplying oil thereto.

5. A self-oiling journal bearing comprising a shaft member, a shell member encircling said shaft member, one of said members being rotative and the other being nonrotative, a bearing sleeve disposed between said shell member and said shaft member, rotatable with the rotative member and having therethrough a plurality of apertures spaced circumferentially and opening adjacent to the bearing surface of the nonrotative member, a band of elastomer material molded in place on said bearing sleeve and having projections integral therewith extending therefrom into the apertures of said sleeve and bonded thereto, the end of each projection being cupped to form an oil-receiving recess in relaxed condition, said band being deformable by pressure exerted by the rotative member during rotation of said bearing sleeve to reduce the volume of such projection recesses for expelling oil therefrom, and the nonrotative member having an oil reservoir at a location spaced circumferentially from the portion of its bearing surface subjected to the greatest radial load and accessible to the recesses of said projections when in expanded condition for supplying oil thereto.

6. A self-oiling journal bearing comprising a nonrotative axle, a rotative shell roller encircling said axle, two bearing sleeves received respectively in the opposite end portions of said roller and encircling said axle, each of said bearing sleeves being rotatable with said shell and having therethrough a plurality of apertures spaced circumferentially and opening adjacent to the bearing surface of said shaft, bands of elastomer material encircling said bearing sleeves, respectively, and having projections extending therefrom inwardly into the apertures of said sleeves and bonded thereto, the inner end of each projection being cupped to form an oil-receiving recess in relaxed condition, the peripheries of said elastomer material bands being conically tapered oppositely away from each other, covering collars received within the roller and fitted snugly around the peripheries of said elastomer material bands, respectively, the interior of said collars being tapered complementally and oppositely to the tapers of said elastomer material bands, set screws bridging between said roller and said covering collars holding said collars and said roller against relative movement both axially and circumferentially, said elastomer material band being deformable by pressure exerted by said roller during rotation of said bearing sleeves to reduce the volume of such projection recesses for expelling oil therefrom onto said axle, and said axle having an oil reservoir in its upper portion accessible to the projection recesses when in expanded condition for supplying oil thereto.

7. A self-oiling journal bearing comprising a nonrotative shaft, a rotative shell encircling said shaft, a rotative bearing sleeve rotatable with said shell and fitted about said shaft in bearing engagement therewith, a band of elastomer material encircling said shaft, engaged by said shell, rotatable with said bearing sleeve and having an inner portion adjacent to said shaft shaped to form an oil-receiving recess, portions of said band being progressively deformable by pressure exerted by rotation of said shell during rotation of said band and said bearing sleeve to reduce the volume of such recess progressively during said band rotation for expelling oil from such recess onto said shaft, and oil reservoir means stationary with respect to said shaft and accessible to such recess when it is in expanded condition for supplying oil thereto.

8. A self-oiling journal bearing comprising a nonrotative shaft, a rotative shell encircling said shaft, a bearing sleeve disposed between said rotative shell and said shaft, rotatable with said shell and having therethrough a plurality of apertures spaced circumferentially and opening adjacent to the bearing surface of said shaft, a band of elastomer material encircling said bearing sleeve, disposed within and engaged by said shell, and having projections extending therefrom inwardly into the apertures of said sleeve, the inner end of each projection being cupped to form an oil-receiving recess next to said shaft in relaxed condition, portions of said band being progressively deformable by pressure exerted by rotation of said shell during rotation of said band and said bearing sleeve to reduce the volume of such projection recesses progressively during said band rotation for expelling oil therefrom onto said shaft, and said shaft having an oil reservoir at a location spaced circumferentially from the portion of its bearing surface subjected to the greatest radial load and accessible to the recesses of said projections when in expanded condition for supplying oil thereto.

9. The self-oiling journal bearing defined in claim 8, in which a covering collar is received within the shell and is fitted snugly around the periphery of the elastomer material band.

10. The self-oiling journal bearing defined in claim 9, in which the periphery of the elastomer material band is conically tapered and the interior of the covering collar is complementally tapered oppositely for engagement with the band by movement axially of the bearing.

11. A self-oiling journal bearing comprising a shaft, a bearing sleeve fitted about said shaft in bearing engagement therewith, said shaft and bearing sleeve being relatively rotatable and said bearing sleeve being rotatable relative to a radial load applied to the bearing, a band of elastomer material encircling said shaft, said band and said shaft being relatively rotatable in the same direction as said bearing sleeve and said shaft, and said band having a portion shaped to form an oil-receiving recess in communication with the space between said shaft and said bearing sleeve, portions of said band being progressively deformable by pressure exerted by relative rotation of the load and said elastomer material band to reduce the volume of such recess progressively for expelling oil from such recess between said shaft and said bearing sleeve, and oil reservoir means stationary with respect to said shaft and supplying oil to such recess when it is in expanded condition.

12. A self-oiling journal bearing comprising a shaft member, a sleeve member fitted about said shaft member in bearing engagement therewith, one of said members being rotatable and the other of said members being nonrotative and subjected to a load generally in one direction radially of the nonrotative member, and an elastomer material member rotative relative to said nonrotative member and having a portion shaped to form an oil-receiving recess in communication with the space between said shaft member and said sleeve member progressively deformable by pressure exerted thereon by rotation thereof relative to said nonrotative member to reduce the volume of such recess progressively for expelling oil therefrom into the space between said shaft member and said sleeve member.

13. A self-oiling bearing comprising first means having lubricant supply means, second means in bearing engagement with said first means, movable relative to said first means and said lubricant supply means and including lubricant-conveying means shiftable by movement of said second means from a position in communication with said lubricant supply means to a position out of communication therewith, said lubricant-conveying means being decreasable in volume to expel lubricant therefrom by an increase in load between said first means and said second means, and means applying a load to said first means and second means which produces a greater pressure between such two means at the location of said lubricant-conveying means when it is in a position out of communication with said lubricant supply means than when it is in a position in communication with said lubricant supply means.

14. The self-oiling bearing defined in claim 13, in which the lubricant-conveying means includes a lubricant-receiving cavity the volume of which is variable.

15. The self-oiling bearing defined in claim 13, in which the bearing is of the journal type, the first means having a cylindrical bearing surface, means for rotating the second means relative to the first means about the axis of such cylindrical bearing surface, and the second means including a bearing sleeve rotatable therewith and such bearing sleeve containing the variable volume lubricant-conveying means.

16. A self-oiling journal bearing comprising two members relatively rotatable about an axis, one of said members having a cylindrical bearing surface concentric with such axis, means for rotating one of said members relative to the other about such axis, a relatively rigid bearing sleeve rotatable with said rotating member and having a passage extending radially therethrough one end of which opens at said bearing surface, resilient means rotatable with said bearing sleeve and extending over the other end of such passage, means for supplying lubricating oil to said passage including reservoir means in said other member adapted to communicate with such passage in one relatively rotated relationship of said members, and means on said resilient means actuated by the changing deformation of said resilient means under radial load during relative rotation of said members for correspondingly reducing the volume of such passage to discharge oil from such passage onto said bearing surface when said members are in a different relatively rotated relationship.

17. The self-oiling journal bearing defined in claim 16, in which the resilient means include an annulus of resilient material disposed adjacent to the relatively rigid bearing sleeve.

18. Mechanism for lubricating the bearing space between relatively rotatable bearing members comprising variable volume lubricant conveying and dispensing means communicating with such bearing space, means guiding said conveying and dispensing means for rotation around such bearing space during relative rotation of said members, means on one of said member supplying lubricant to a portion of said conveying and dispensing means in one rotative position thereof during relative rotation of said members, and means responsive to unequally distributed radial loading between said members during relative rotation thereof for automatically reducing the volume of such portion of said conveying and dispensing means in a rotative position thereof different from that in which lubricant was supplied to such portion, for expelling lubricant into such bearing space at a location where the bearing members are more heavily loaded than where the lubricant was supplied to said conveying and dispensing means.

References Cited in the file of this patent

UNITED STATES PATENTS

| | | |
|---|---|---|
| 731,978 | Tobin | June 23, 1903 |
| 783,655 | Voltz et al. | Feb. 28, 1905 |
| 1,246,627 | McClure | Nov. 13, 1917 |
| 2,767,035 | Von Euw | Oct. 16, 1956 |